(12) United States Patent
Bingham

(10) Patent No.: US 7,377,070 B2
(45) Date of Patent: May 27, 2008

(54) FISHING REEL MOUNT ASSEMBLY

(76) Inventor: Charles P. Bingham, 2141 NE. 44th St., Lighthouse Point, FL (US) 33064

( * ) Notice: Subject to any disclaimer, the term of this patent is extended or adjusted under 35 U.S.C. 154(b) by 0 days.

(21) Appl. No.: 11/436,005

(22) Filed: May 17, 2006

(65) Prior Publication Data
US 2007/0266617 A1 Nov. 22, 2007

(51) Int. Cl.
*A01K 87/06* (2006.01)
(52) U.S. Cl. ............... 43/22; 242/310; 242/316
(58) Field of Classification Search ............ 43/22; 242/310, 316
See application file for complete search history.

(56) References Cited

U.S. PATENT DOCUMENTS

| | | | | |
|---|---|---|---|---|
| 282,270 A * | 7/1883 | Chubb | ............ | 43/22 |
| 484,439 A * | 10/1892 | Lockwood | ............ | 43/22 |
| 506,607 A * | 10/1893 | Ruddock | ............ | 43/22 |
| 639,008 A * | 12/1899 | Wisner | ............ | 242/316 |
| 685,185 A * | 10/1901 | Smith | ............ | 242/316 |
| 718,589 A * | 1/1903 | Tredwell | ............ | 43/22 |
| 773,703 A * | 11/1904 | Bartlett | ............ | 43/22 |
| 858,881 A * | 7/1907 | Letterman | ............ | 43/22 |
| 930,181 A * | 8/1909 | Huffman | ............ | 43/22 |
| 1,494,552 A * | 5/1924 | Kawell | ............ | 43/22 |
| 1,752,027 A * | 3/1930 | Pflueger | ............ | 43/22 |
| 1,883,041 A * | 10/1932 | Somers | ............ | 43/22 |
| 1,897,711 A * | 2/1933 | Phillippe | ............ | 242/316 |
| 1,941,739 A * | 1/1934 | Crawferd | ............ | 242/310 |
| 1,991,407 A * | 2/1935 | Miller et al. | ............ | 43/22 |
| 1,995,242 A * | 3/1935 | Clarke | ............ | 43/22 |
| 2,022,204 A * | 11/1935 | Kovalovsky | ............ | 43/22 |
| 2,038,344 A * | 4/1936 | Clarke | ............ | 43/22 |
| 2,111,447 A * | 3/1938 | Grieten | ............ | 43/22 |
| D116,927 S * | 10/1939 | Wilson | ............ | 43/22 |
| 2,182,468 A * | 12/1939 | Coxe | ............ | 43/22 |
| 2,191,004 A * | 2/1940 | Whitcomb | ............ | 43/22 |
| 2,196,765 A * | 4/1940 | Fries | ............ | 242/316 |
| 2,198,588 A * | 4/1940 | Stephens | ............ | 43/22 |
| 2,198,856 A * | 4/1940 | Bowman | ............ | 43/20 |
| 2,261,629 A * | 11/1941 | Murphy | ............ | 242/316 |
| 2,298,481 A * | 10/1942 | Hayes | ............ | 242/310 |
| 2,329,982 A * | 9/1943 | Coxe | ............ | 242/310 |
| 2,409,940 A * | 10/1946 | Kay | ............ | 43/22 |
| 2,541,183 A * | 2/1951 | Abele | ............ | 242/310 |
| 2,575,588 A * | 11/1951 | Fritts | ............ | 242/316 |
| 2,699,622 A * | 1/1955 | Stevens | ............ | 43/22 |
| 2,705,601 A * | 4/1955 | Clickner | ............ | 43/22 |

(Continued)

FOREIGN PATENT DOCUMENTS

JP 11-289927 A * 10/1999

(Continued)

*Primary Examiner*—Darren W Ark
(74) *Attorney, Agent, or Firm*—J. Wiley Horton

(57) ABSTRACT

A modified reel and mounting assembly for attaching a fishing reel to a fishing rod. The assembly includes a cutout in the reel which conforms to the surface of the reel seat and an arcuate slot on both ends of the cutout. The cutout in the reel mates with surface of the reel seat, and the seat mounts are received by the arcuate slots. The arcuate slots create a lip which is clamped into place by the clamps of the rod seat. In the preferred embodiment, a clamp bar is also provided for increased stability.

7 Claims, 10 Drawing Sheets

U.S. PATENT DOCUMENTS

| | | | |
|---|---|---|---|
| 2,855,718 A * | 10/1958 | Stephens | 43/22 |
| 2,929,578 A * | 3/1960 | Dell | 43/22 |
| 2,929,579 A * | 3/1960 | Dell | 43/22 |
| 3,072,356 A * | 1/1963 | Leuthner | 242/316 |
| 3,077,318 A * | 2/1963 | Du Val | 242/250 |
| 3,166,269 A * | 1/1965 | Veroli | 242/310 |
| 3,226,052 A * | 12/1965 | King | 242/316 |
| 3,226,873 A * | 1/1966 | Wood | 43/22 |
| 3,364,612 A * | 1/1968 | Holahan | 43/22 |
| 3,419,992 A * | 1/1969 | Strahm | 43/22 |
| 3,443,335 A * | 5/1969 | Guydos | 43/22 |
| 3,446,453 A * | 5/1969 | Pachner | 242/310 |
| 3,501,859 A * | 3/1970 | Perkins | 43/22 |
| 3,789,535 A * | 2/1974 | Esplin | 43/22 |
| 3,993,267 A * | 11/1976 | Murvall | 242/310 |
| 4,151,966 A * | 5/1979 | Lindsay | 242/310 |
| 4,422,600 A * | 12/1983 | Preston | 242/310 |
| 4,688,346 A * | 8/1987 | Collins | 43/22 |
| 4,830,306 A * | 5/1989 | Tsunoda et al. | 43/22 |
| 5,012,607 A * | 5/1991 | Meschkat | 43/22 |
| 5,125,594 A * | 6/1992 | Kaneko | 43/22 |
| 5,377,441 A * | 1/1995 | Noda | 43/22 |
| 5,557,875 A * | 9/1996 | Testa | 43/22 |
| 5,956,884 A * | 9/1999 | Goodrich | 43/22 |
| 7,114,282 B2 * | 10/2006 | Nakagawa | 43/22 |

FOREIGN PATENT DOCUMENTS

| | | | |
|---|---|---|---|
| JP | 2001-69881 A | * | 3/2001 |
| JP | 2002-17212 A | * | 1/2002 |
| JP | 2002-204638 A | * | 7/2002 |
| JP | 2002-218869 A | * | 8/2002 |
| JP | 2004-121179 A | * | 4/2004 |

* cited by examiner

FISHING REEL MOUNT ASSEMBLY

BACKGROUND OF THE INVENTION

1. Field of the Invention

This invention relates to the field of fishing reels. More specifically, the present invention comprises a new fishing reel attachment mechanism for attaching a fishing reel to a fishing rod.

2. Description of the Related Art

Many different attachment mechanisms are known for attaching a fishing reel to a fishing rod. The most common attachment mechanism, however, is a foot/seat attachment as illustrated in FIGS. 1, 2A, and 2B. Reel 12 includes foot 26 which is attached to its base (in the orientation of FIG. 1). Typically, foot 26 is attached to reel 12 with bolts, screws, or welding. Reel 12 also includes crank 24 and crank knob 42 which are used to spool the fishing line back into reel 12.

As shown in FIGS. 2A and 2B, reel 12 is attached to a fishing rod by placing foot 26 into rod seat 52 on rod 32. Many different rod seats are known, but common rod seats typically feature a pair of adjustable seat mounts 44 and 46. One common variety utilizes screw-type clamps as illustrated in FIG. 2A and FIG. 2B. Adjustable seat mounts 44 and 46 each have collar 38 and 40 respectively. Generally, reel 12 is attached by inserting leading edge 48 of foot 26 into adjustable seat mount 44 between collar 38 and the surface of reel seat 52. Adjustable seat mount 46 is then advanced along the length of rod 32 by a screwing motion until it locks foot 26 into place (as shown in FIG. 2A). In the example illustrated in FIGS. 2A and 2B, rod 32 has male threads along seat 52, and female threads are used on the inside surface of adjustable seat mounts 44 and 46. Adjustable seat mount 46 and adjustable seat mount 44 clamp foot 26 firmly to rod 32 so that reel 12 cannot move up or down rod 32 or rotate angularly about rod 32. Although screw-type clamps are most common, adjustable seat mounts 44 and 46 may assume many different configurations.

Although this is the most commonly used mechanism for attaching a reel to a rod, the use of a foot/seat attachment mechanism such as shown in FIG. 2A has some negative effects. First, the use of a foot creates displacement between the reel and the rod. When the user applies force to turn crank knob 42, the rod will try to twist. The user must attempt to counteract this twisting force with his or her rod-gripping hand. This may result in premature fatigue to an angler who is fighting a large fish for a long period of time. It also may reduce the angler's sensitivity to the action of the fish.

In addition, a foot is susceptible to bending or breaking from the reel when the fishing line is periodically subjected to large amounts of tension. When the fishing line is placed under tension, the reel is pulled in the direction of the tip of the fishing rod. Over time, these forces can deform the foot or cause the attachment mechanism which attaches the foot to the reel to weaken.

Accordingly it would be desirable to have an attachment mechanism for attaching a fishing reel to a fishing rod that minimizes torque and is less susceptible to failure.

BRIEF SUMMARY OF THE PRESENT INVENTION

The present invention comprises a modified reel and mounting assembly for attaching a fishing reel to a fishing rod. The assembly includes a cutout in the reel which conforms to the surface of the reel seat and an arcuate slot on both ends of the cutout. The cutout in the reel mates with surface of the reel seat, and the seat mounts are received by the arcuate slots. The arcuate slots create a lip which is clamped into place by the clamps of the rod seat. In the preferred embodiment, a clamp bar is also provided for increased stability.

REFERENCE NUMERALS IN THE DRAWINGS

| 10 | mount assembly | 12 | reel |
| --- | --- | --- | --- |
| 14 | clamp bar | 16 | clamp screw |
| 18 | cutout | 20 | cutout |
| 22 | arcuate slot | 24 | crank |
| 26 | foot | 28 | clamp screw hole |
| 30 | lip | 32 | rod |
| 34 | fishing line | 36 | spool |
| 38 | collar | 40 | collar |
| 42 | crank knob | 44 | adjustable seat mount |
| 46 | adjustable seat mount | 48 | leading edge |
| 50 | trailing edge | 52 | reel seat |
| 54 | hexagonal reel seat | 56 | hexagonal cutout |
| 58 | arcuate slot | 60 | adjustable seat mount |
| 62 | adjustable seat mount | 64 | hexagonal collar |
| 66 | hexagonal collar | 68 | clamp bar |
| 70 | hexagonal cutout | | |

DESCRIPTION OF THE INVENTION

Figure 1:
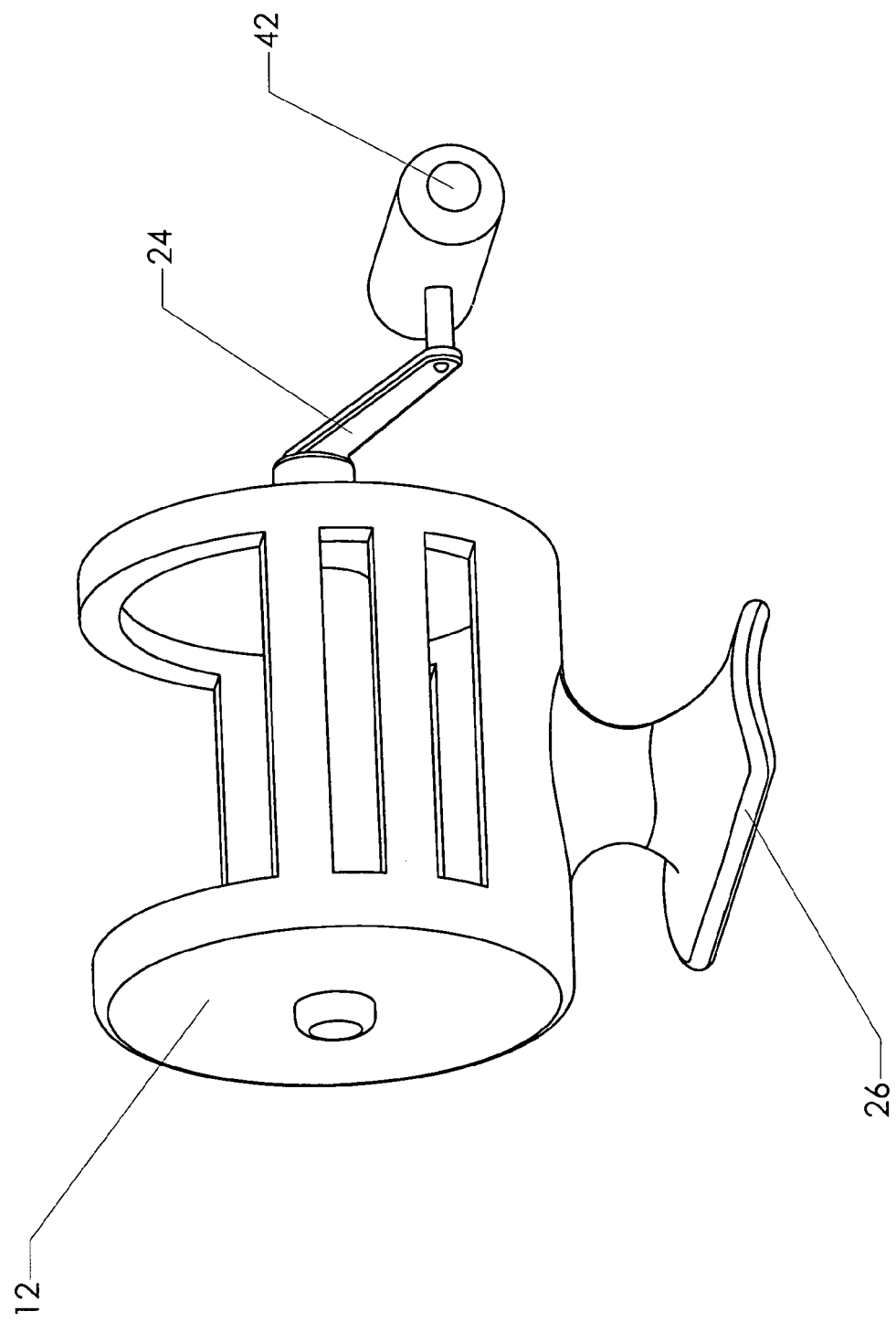
FIG. 1 is a perspective view, showing a prior art reel.
Figure 2A:
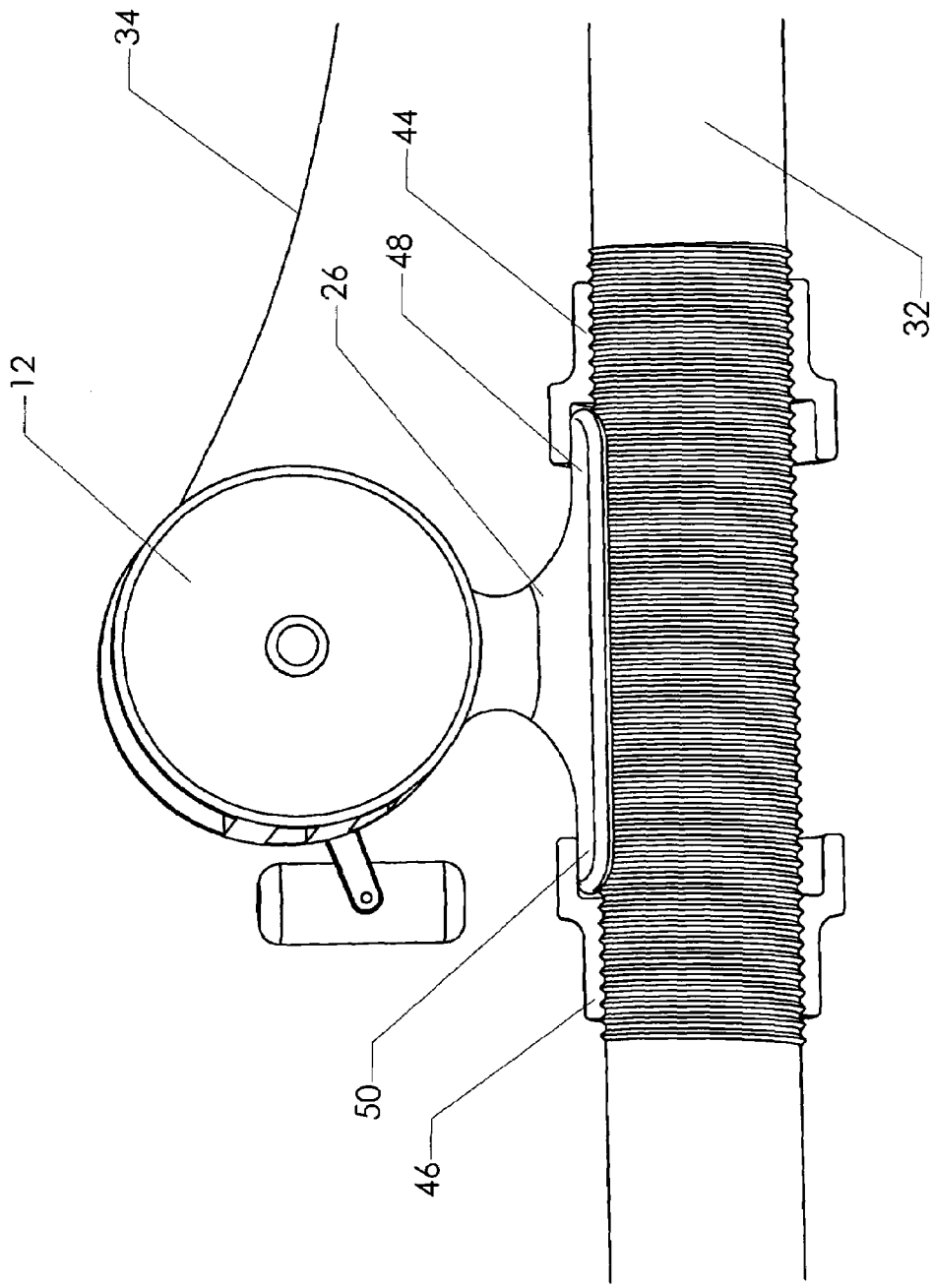
FIG. 2A is a perspective view with a cutaway, showing a prior art reel attachment mechanism.
Figure 2B:
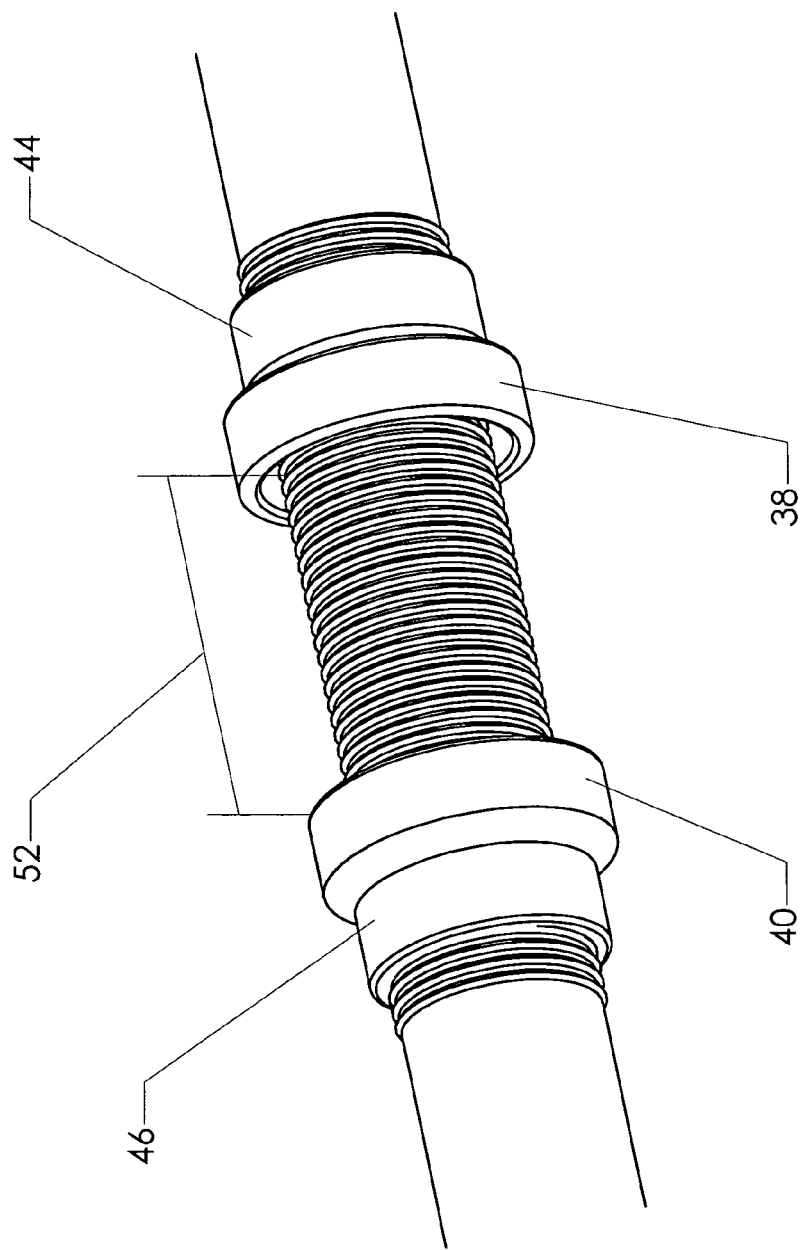
FIG. 2B, is a perspective view, showing a prior art reel attachment mechanism
Figure 3:
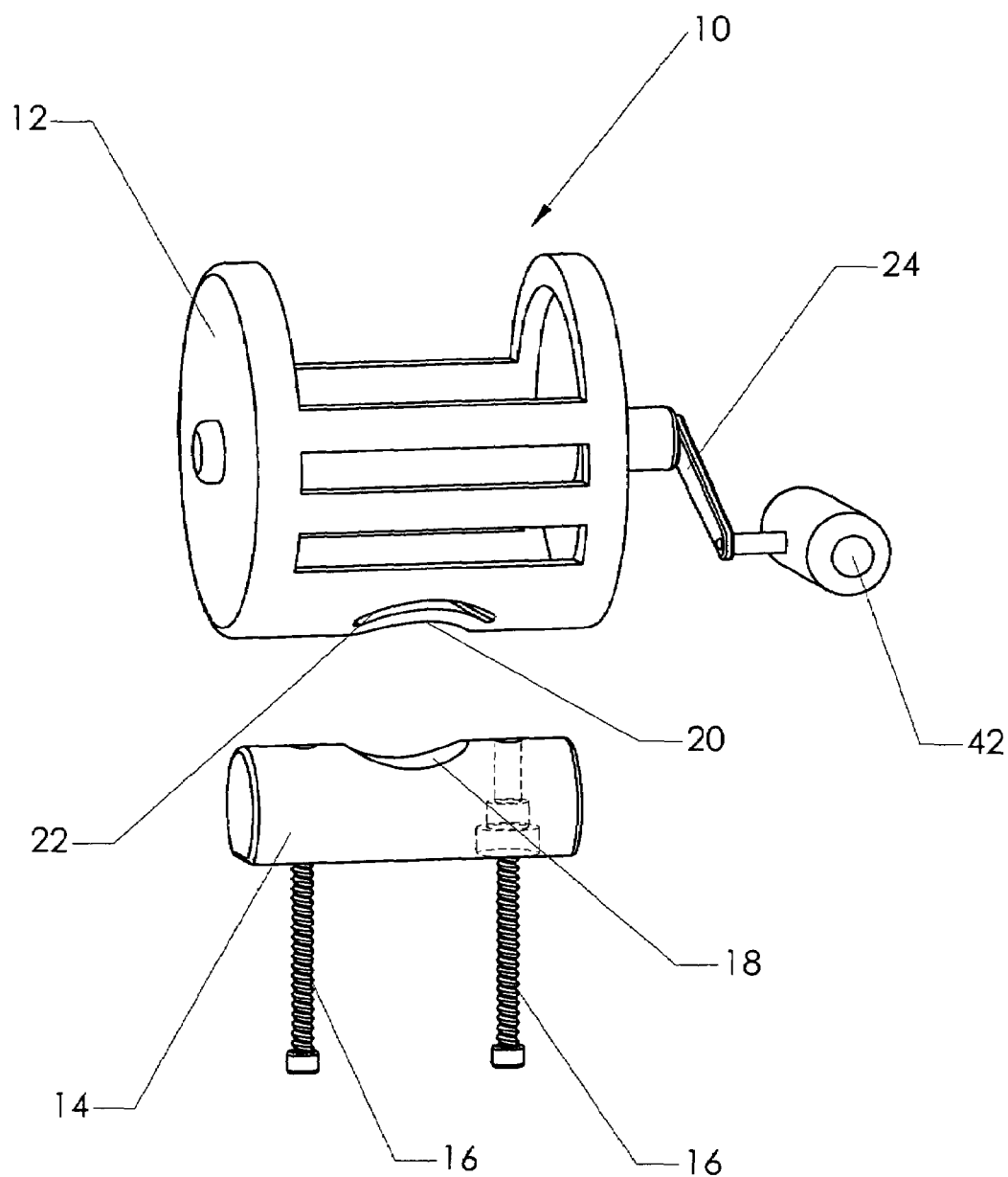
FIG. 3 is a perspective view, showing the present invention.

The present invention, mount assembly 10, is illustrated in FIG. 3. Mount assembly 10 generally includes reel 12 and clamp bar 14, which are attached together around a fishing rod when reel 12 is positioned in the reel seat. Reel 12 may be any type of fishing reel. The particular version shown in FIG. 3 is a "conventional" type (as opposed to a spinning type). Reel 12 includes crank 24 and crank knob 42 which are used to spool fishing line back into reel 12 once the line has been unspooled.

Cutout 20 is provided in the surface of reel 12 which faces the reel seat. In the preferred embodiment, cutout 20 is a substantially defined by a portion of a cylindrical surface having a central axis running from a rear of the reel 12 to the front of the reel 12 cylindrical cutout. Cutout 20 may be other shape that would conform to the surface of the reel seat, however. In the preferred embodiment, the diameter of the cutout 20 may be set to accommodate the diameter of the fishing rod that will be used with the fishing reel. Cutout 20 allows reel 12 to be mounted as closely to the fishing rod as possible. This minimizes the twisting torque applied to the rod when the user turns crank 24 since the displacement of the crank-turning force from the fishing rod is minimized. Cutout 20 also creates a more stable attachment by increasing the "contact" surface area between reel 12 and the reel seat. Arcuate slot 22 is included on both ends of cutout 20 so that reel 12 may be mounted to most common fishing rods with seat clamps.

Clamp bar 14 also has cutout 18 to increase "contact" surface area between clamp bar 14 and the surface of the reel seat. Cutout 18 is preferably cylindrical to conform to the surface of most reel seats. A pair of clamp screws 16 are provided to attach clamp bar 14 to reel 12. This allows clamp bar 14 and reel 12 to be tightly clamped around the fishing rod. Clamp bar 14 may also be a simple metal plate that is bent to conform to the surface of the reel seat.

Figure 4A:
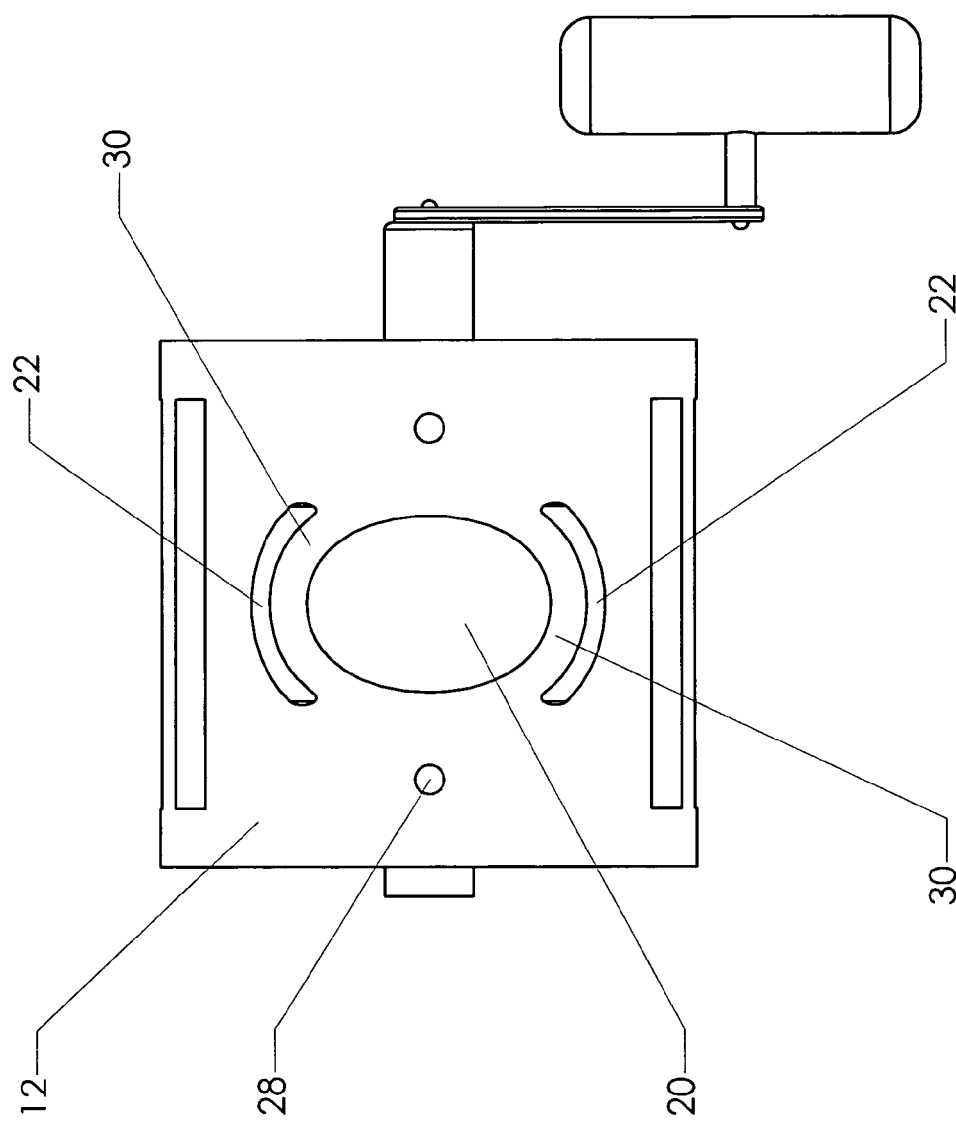
FIG. 4A is a bottom view, showing the present invention
Figure 4B:
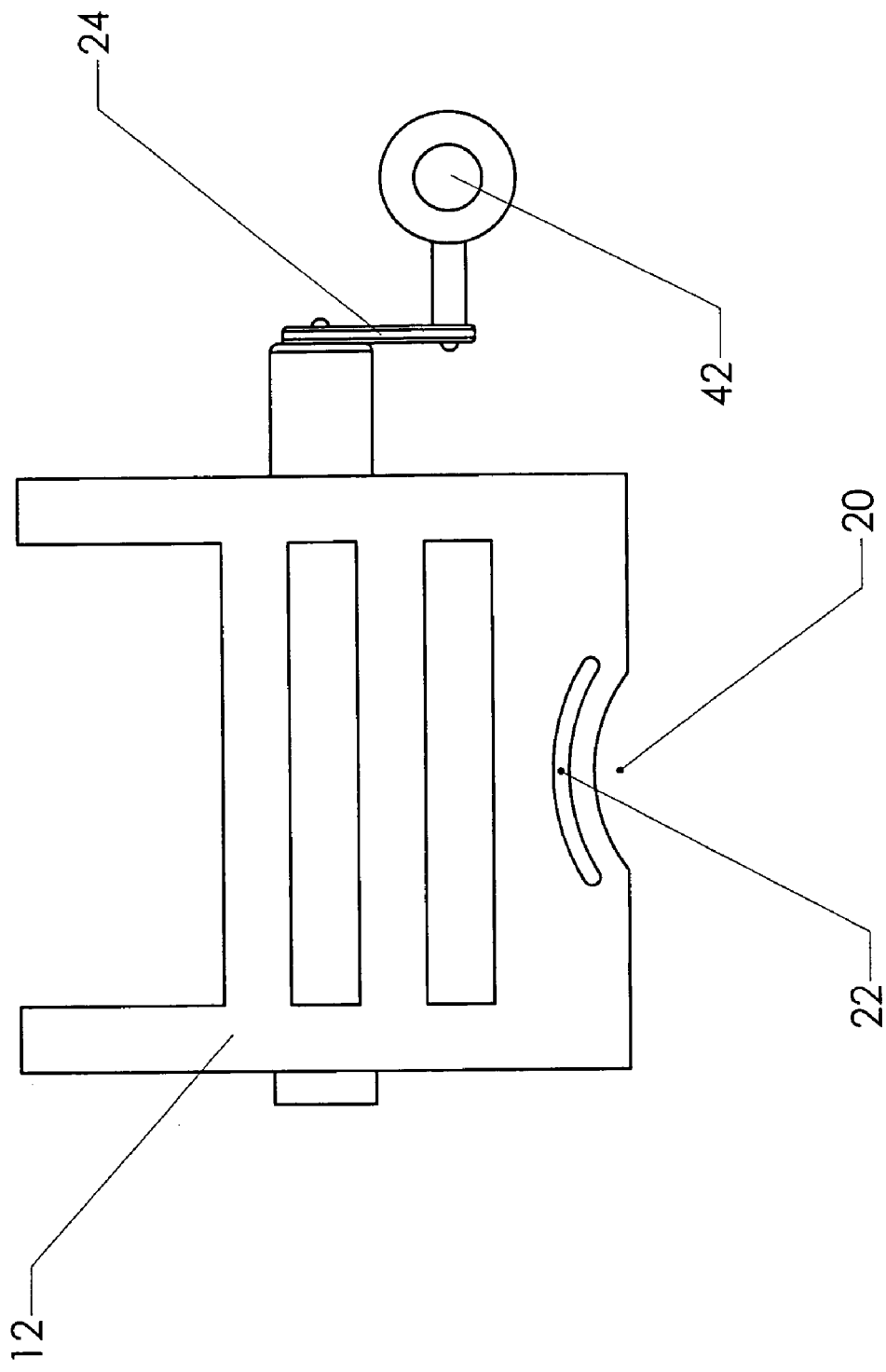
FIG. 4B is a front view, showing the present invention.

The various cutouts in the surface of reel 12 are shown in greater detail in FIGS. 4A and 4B. FIG. 4A is a bottom view of reel 12, and FIG. 4B is a front view of reel 12. As illustrated in FIGS. 4A and 4B, cylindrical-shaped cutout 20 forms an oval shape in the bottom of reel 12. An arcuate slot 22 is provided on both ends of cutout 20, each of the arcuate slots 22 having an opening circumscribed by a perimeter and a depth, the depth extending from the opening into the reel 12 in a direction which is parallel to the central axis of the portion of the cylindrical surface defining the cutout 20. The combination of cutout 20 and arcuate slot 22 forms lip 30. Clamp screw holes 28 are provided on both sides of cylindrical cutout 20 and are configured to receive the pair of mount screws 16 as shown in FIG. 3.

These "cutouts" may be easily made either by hand machining or by computer controlled machine tools such as a CNC machine. They can also be cast into the reel if the reel body is made by casting. Although the term "cutout" is used frequently throughout this specification to describe these features, it should be understood that these features may also be created using molding, casting or other techniques.

Figure 5:
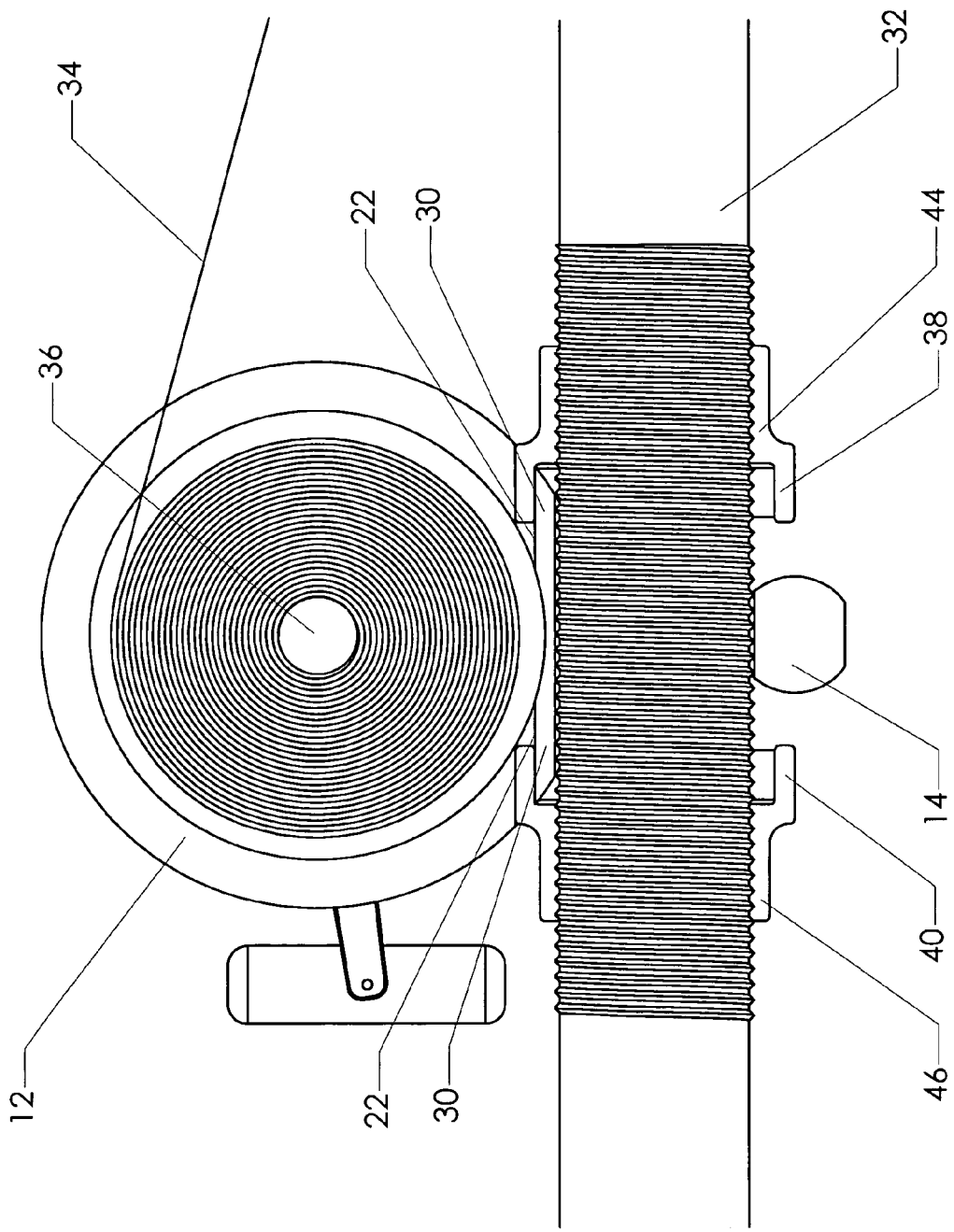
FIG. 5 is a section view, showing the present invention.

FIG. 5 is a section view illustrating how reel 12 may be attached to a fishing rod. In the present illustration reel 12 is sectioned but not the fishing rod. Reel 12 has fishing line 34 attached to spool 36 and fed through guides (not shown) to the tip of rod 32. Reel 12 is attached to the reel seat between collars 38 and 40 of adjustable seat mounts 44 and 46. Although adjustable seat mount 44 with collar 38 and adjustable seat mount 46 with collar 40 are illustrated in FIG. 5, any type of seat clamp may be used.

To attach reel 12 to the reel seat of rod 32, lip 30 is inserted between adjustable seat mount 44 and rod 32 so that collar 38 of adjustable seat mount 44 is received in the forward arcuate slot 22. Reel 12 is held flush against the reel seat so that the reel seat is maintained within cutout 20. Adjustable seat mount 46 is then rotated about rod 32 so that it travels in the direction of reel 12. As adjustable seat mount 46 nears reel 12, lip 30 is captured between collar 40 of adjustable mount 46 and rod 32. The wall of collar 40 simultaneously enters arcuate slot 22. The user continues to turn adjustable seat mount 46 until reel 12 is firmly clamped between adjustable seat mount 46 and adjustable mount 44. Clamp bar 14 is then positioned on the surface of rod 32 opposite reel 12 and clamp screws 16 are used to attach clamp bar 14 and reel 12 together around rod 32.

Figure 6:
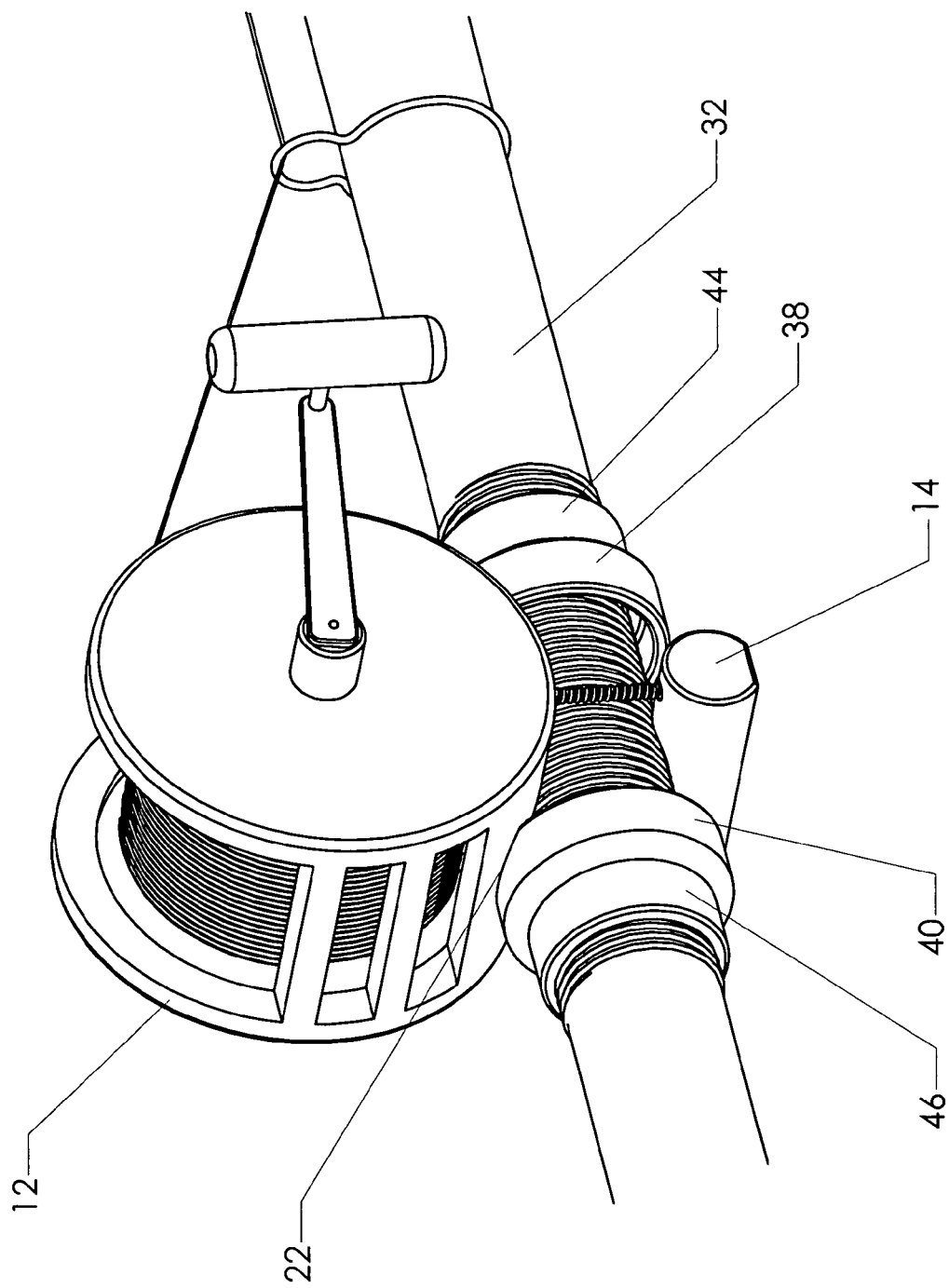
FIG. 6 is a perspective view, showing the present invention mounted on a rod.

FIG. 6 is a perspective view showing the same assembly. Reel 12 is mounted in the reel seat of rod 32 between adjustable seat mount 44 and adjustable seat mount 46. Reel 12 is also mounted to the reel seat by clamp bar 14 by clamp screws 16.

Figure 7A:
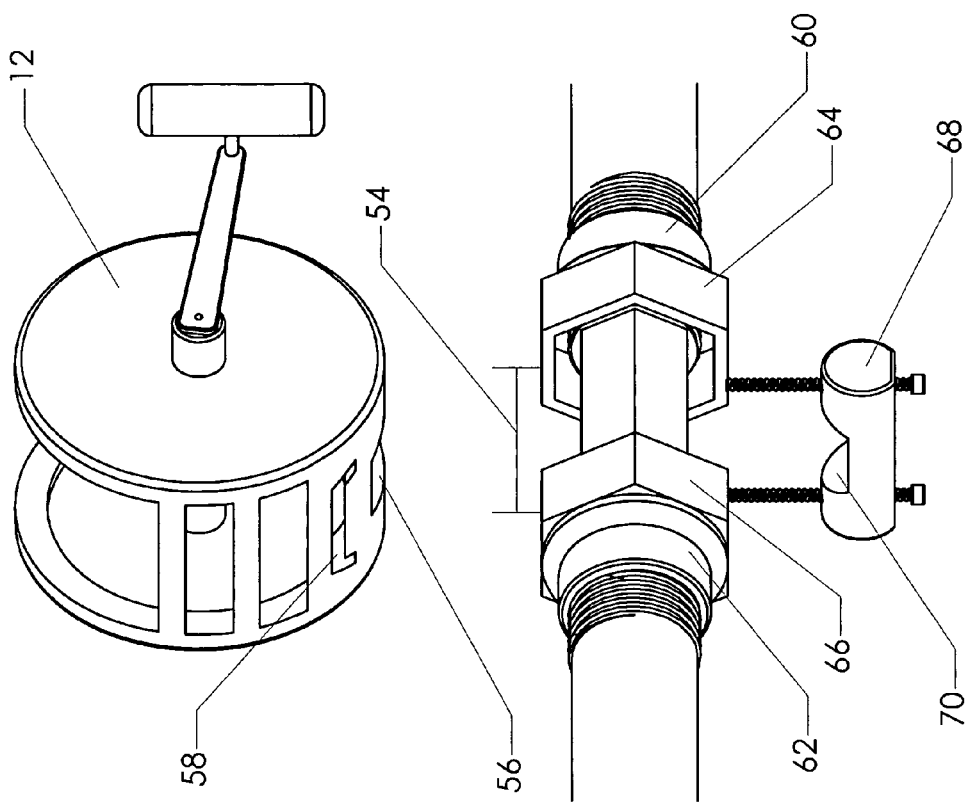
FIG. 7A is a perspective view, showing an alternate embodiment of the present invention.
Figure 7B:
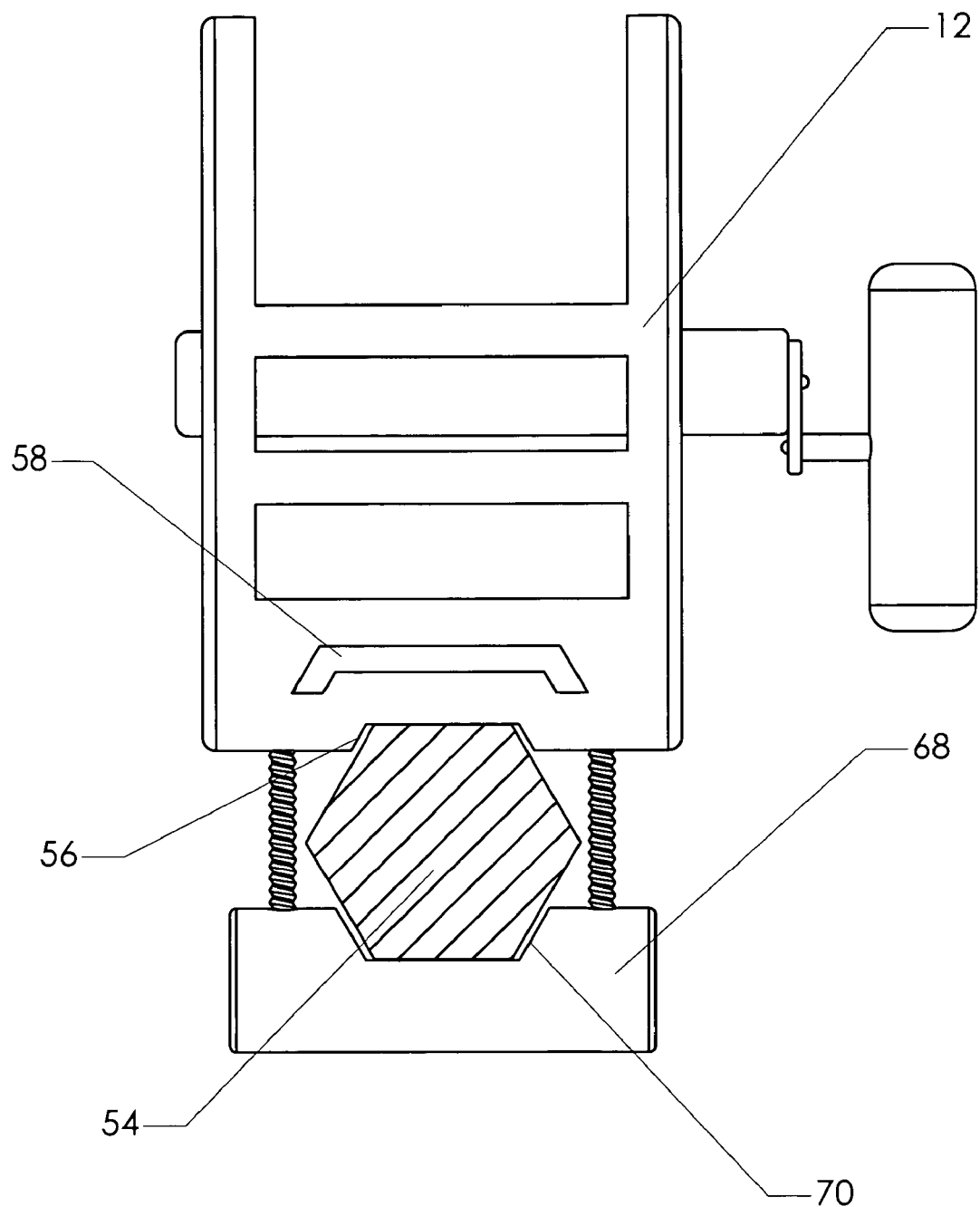
FIG. 7B is a section view, showing an alternate embodiment of the present invention.

The reader will appreciate that reel 12 may also be connected to rods having other varieties of seat clamps other than the clamps depicted in FIGS. 5 and 6. For example, reel 12 may also be connected to a rod having hexagonal reel seat 54 with a hexagonally-shaped cross-section as shown in FIGS. 7A and 7B. In this embodiment, hexagonal collars 64 and 66 are provided on adjustable seat mounts 60 and 62. Hexagonal collars 64 and 66 swivel on adjustable seat mounts 60 and 62 so that they may be rotated independently of the adjustable seat mounts. Hexagonal cutout 56 which conforms to the surface of hexagonal reel seat 54 is provided on the bottom of reel 12. Arcuate slots 58 are provided on both ends of hexagonal cutout 56 and are configured to receive hexagonal collars 64 and 66. Clamp bar 68 also has hexagonal cutout 70 which is shaped to conform to the surface of hexagonal reel seat 54.

Reel 12 with hexagonal cutout 56 is installed on the rod similar to the embodiment shown and described in relation to FIGS. 3-6. Reel 12 is placed on hexagonal reel seat 54 and is mated with adjustable seat mount 60 so that hexagonal collar 64 is received within arcuate slot 58. Adjustable seat mount 62 is then rotated with respect to the rod until hexagonal collar 66 is received within arcuate slot 58. Clamp bar 68 is then attached as before.

FIG. 7B is a section view illustrating how hexagonal cutout 56 of reel 12 and hexagonal cutout 70 of clamp bar 68 conform to the surface of hexagonal reel seat 54 when the two components are clamped around hexagonal reel seat 54. The reader will appreciate that the cutouts can be made in many different shapes to conform to various reel seat surfaces. For example, the reader will easily envisage that cutouts can be provided to conform to any regular or irregular surface including but not limited to reel seats having triangular, square, oval, pentagonal, hexagonal, heptagonal, octagonal cross-sections.

Although the preceding descriptions contain significant detail they should not be viewed as limiting the invention but rather as providing examples of the preferred embodiments of the invention. For example, arcuate slot 22 may be formed in shapes other than an arch. The mount assembly would function the same if arcuate slot 22 was rectangular although the dimensions of the a rectangular slot would be different than the arch-shaped slot shown in the drawing views. Accordingly, the scope of the invention should be determined by the following claims, rather than the examples given.

I claim:

1. A fishing reel for mounting on a fishing rod, said fishing rod having a first collar, a second collar, and a cylindrical reel seat therebetween, with said distance between said first collar and said second collar being adjustable, said fishing rod further having a first end, a second end, and a central axis extending therebetween, said fishing reel comprising:

a. a body containing a rotating spool configured to hold a fishing line, said body having a downward facing surface, a forward side configured to allow said fishing line to exit, and a rearward side;

b. a concave cylindrical cutout in said downward facing surface of said body and integral thereto, said concave cylindrical cutout defined by a portion of a cylindrical surface having a central axis running from said rearward side of said body to said forward side of said body, said concave cylindrical cutout configured to receive said reel seat, said cylindrical cutout having a first extreme proximate to said rearward side of said body and a second extreme proximate to said forward side of said body, said concave cylindrical cutout being configured such that when said fishing reel is installed on said fishing rod, said central axis of said portion of said cylindrical surface defining said concave cylindrical cutout is aligned with said central axis of said rod;

c. a first arcuate slot in said downward facing surface of said body and integral thereto proximate said first extreme of said concave cylindrical cutout, thereby forming a first lip between said first arcuate slot and said first extreme of said concave cylindrical cutout, wherein said first arcuate slot is concentric with said central axis of said portion of said cylindrical surface defining said concave cylindrical cutout, said first arcuate slot having an opening circumscribed by a perimeter and a depth, said depth extending from said opening into said body in a direction parallel to said central axis of said portion of said cylindrical surface defining said concave cylindrical cutout, said opening facing said rearward side of said body;

d. a second arcuate slot in said downward facing surface of said body and integral thereto proximate said second extreme of said concave cylindrical cutout, thereby forming a second lip between said second arcuate slot and said second extreme of said concave cylindrical cutout, wherein said second arcuate slot is concentric with said central axis of said portion of said cylindrical surface defining said concave cylindrical cutout, said second arcuate slot having an opening circumscribed by a perimeter and a depth, said depth extending from said opening into said body in a direction parallel to said central axis of said portion of said cylindrical surface defining said concave cylindrical cutout, said opening facing said forward side of said body;

e. wherein said first arcuate slot is open toward said rearward side of said body so that said first arcuate slot can receive said first collar of said fishing rod; and f. wherein said second arcuate slot is open toward said forward side of said body so that said second arcuate slot can receive said second collar of said fishing rod.

2. The fishing reel of claim 1, further comprising a clamp bar, said clamp bar configured to mate with said reel seat and attach to said body, thereby clamping said fishing rod between said body of said fishing reel and said clamp bar.

3. The fishing reel of claim 2, said clamp bar further comprising a second cylindrical cutout configured to mate with said reel seat.

4. The fishing reel of claim 3, wherein said clamp bar is attached to said body by a plurality of threaded fasteners.

5. The fishing reel of claim 2, wherein said clamp bar is attached to said body by a plurality of threaded fasteners.

6. The fishing reel of claim 1, wherein said first arcuate slot and said second arcuate slot are milled into said fishing reel.

7. The fishing reel of claim 1, wherein said first arcuate slot and said second arcuate slot are cast into said fishing reel.

* * * * *